United States Patent [19]

Dill et al.

[11] Patent Number: 4,698,757

[45] Date of Patent: Oct. 6, 1987

[54] TERMINAL PROCEDURE FOR UTILIZING HOST PROCESSOR LOG ON AND LOG OFF PROMPTS

[75] Inventors: David M. Dill, Roanoke; Holly F. Redmond, Arlington, both of Tex.

[73] Assignee: International Business Machines Corp., Armonk, N.Y.

[21] Appl. No.: 671,863

[22] Filed: Nov. 15, 1984

[51] Int. Cl.⁴ .............................................. G06F 15/16
[52] U.S. Cl. .................................. 364/300; 364/900
[58] Field of Search ... 364/200 MS File, 300 MS File, 364/900 MS File; 178/22.08; 179/2 DP

[56] References Cited

U.S. PATENT DOCUMENTS

| | | | |
|---|---|---|---|
| 3,371,321 | 2/1968 | Adams | 364/900 |
| 4,234,933 | 11/1980 | Adelson et al. | 364/900 |
| 4,310,720 | 1/1982 | Cherk, Jr. | 178/22.08 |
| 4,377,852 | 3/1983 | Thompson | 364/900 |
| 4,393,498 | 7/1983 | Jackson et al. | 371/29 |
| 4,399,502 | 8/1983 | MacDonald et al. | 364/900 |
| 4,403,303 | 9/1983 | Howes et al. | 364/900 |
| 4,434,326 | 2/1984 | Koeck et al. | 179/2 DP |
| 4,441,160 | 4/1984 | Azcua et al. | 364/900 |
| 4,443,664 | 4/1984 | Gange | 179/2 DP X |
| 4,454,594 | 6/1984 | Heffron et al. | 364/900 |
| 4,480,307 | 10/1984 | Budde et al. | 364/200 |
| 4,566,078 | 1/1986 | Crabtree | 364/300 |
| 4,604,686 | 8/1986 | Reiter et al. | 364/200 |

OTHER PUBLICATIONS

An Introduction to Database Systems (Third Edition), by C. J. Date, IBM Corporation, Addison-Wesley Pub. Co.

Primary Examiner—Archie E. Williams, Jr.
Assistant Examiner—William C. Niessen
Attorney, Agent, or Firm—C. Lamont Whitham

[57] ABSTRACT

An application program automatically logs on and logs off user networks by using an internal table of prompts and responses which was constructed when the user logged onto a user-specified network and responded in the usual way to prompts sent by the host data processing system. The construction of the table is done once during a teaching session, and another teaching session is required only if the user adds another network or the parameters of the previously added network change.

6 Claims, 10 Drawing Figures

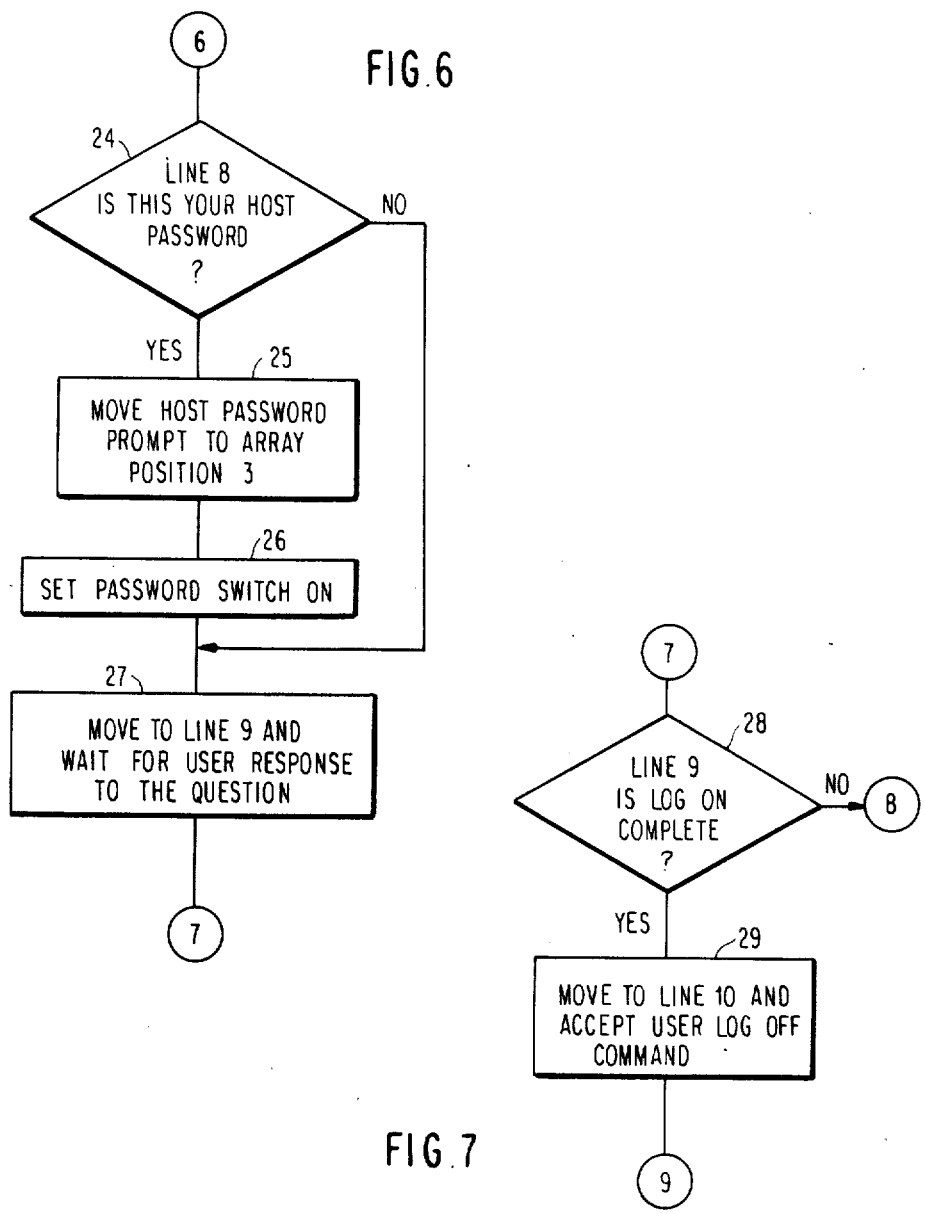

TERMINAL PROCEDURE FOR UTILIZING HOST PROCESSOR LOG ON AND LOG OFF PROMPTS

BACKGROUND OF THE INVENTION

This invention generally relates to accessing a host data processor using a terminal connected to the host data processor via a communications network and, more particularly, to an application program at the terminal which allows the user to define the procedure to log on and log off user networks that were undefined at the time the program was written.

Host data processing systems with remote terminals are used in a variety of applications. For example, various information services may be accessed by subscribers with a variety of hardware terminals ranging from so-called "dumb" terminals to personal computers and word processors. The terminals are connected to the host data processing system over commercial telephone lines by first accessing a communication network. The procedure followed by a subscriber in accessing a specific information service is to first dial the desired communication network, then when that connection is made to the information service, the subscriber is prompted at the terminal to enter a user identification number and a password. The host data processing system of the information service responds to the entry of an active user identification number and a corresponding valid password by allowing the subscriber access to the data base.

Another example is a business environment wherein the terminals are either directly cabled to the host or the connection is made by a dedicated telephone line. Specific examples of such systems are electronic funds transfer (EFT) and point of sales (POS) systems. Such systems are "predefined" in terms of the communications network and the protocol for connecting and identifying a terminal to the host. However, the trend for host data processing systems in business environments is to assume a more open architecture in terms of access by a variety of terminals via various communication networks; i.e., an architecture not unlike that described for information services. This would allow, for example, a user to access several different financial institutions at which accounts were maintained by the user with a single terminal for purposes of affecting transactions at those institutions.

The procedure for accessing a host from a remote terminal is termed "logging on". Conversely, the procedure for terminating access is termed "logging off". While logging off is generally less involved than logging on, it is usually necessary to follow some predetermined protocol to effect log off so that the communication network and the host are properly informed that access is to be terminated. The problem in accessing a host data processing system with a remote terminal is that the protocols for log on and log off are not standardized from one system to another. Moreover, the protocols may be subject to change due to assigning new user identification numbers or passwords or as a result of the systems becoming larger and more sophisticated. As a result, the user is confronted with a confusing set of log on and log off protocols.

This problem has been solved in some communication software applications which provide the user with a macro development tool for generating macros for logging onto each of the various host data processing systems that the user may access. However, when using the macro development procedure, the user must use a special macro language and code his or her actual responses and the prompts from the host; i.e., the user must know both the responses and the prompts according to the log on protocol of the particular host for which the macro is being generated.

SUMMARY OF THE INVENTION

It is therefore an object of the present invention to provide a simplified procedure for generating the automatic logs on and logs off for a variety of user networks.

It is another object of this invention to provide a program capable of automatically logging on and off the user networks that were undefined to the program authors at the time the program was written.

It is a further object of the invention to provide a program that allows the user to "teach" the log on and log off procedure for a particular host to the user's terminal.

According to the invention, the log on and log off instruction process is performed by the user only one time for a given host or user network. After that, the system automatically dials and logs onto the host network for the user. Another teaching session is required only if another network is added or the protocol for a previously added network changes for some reason. The procedure followed is to first enter the teach mode and then, in response to a prompt, select the communications network. When the terminal's modem successfully makes a connection with the host, the user is then prompted to enter the correct acknowledgement code assigned by the network. Next, the user is prompted to enter his or her identification (ID) which may be an alphanumeric code word. There may follow messages from the host that should be ignored for purposes of the log on procedure. By pressing a designated key, the user tells the program to ignore such messages in which case the messages are not stored so that the system does not watch for them in future log ons. The log on procedure continues until completion with the user responding to prompts from the host to enter, for example, a password and a keyword, if one is assigned to the user by the host. The program stores all of the messages sent by the host which the user has not told the program to ignore. In addition, the program stores the user's responses to each of the stored messages. After every user response, the program asks the user if log on is complete. This may be after the user has entered his or her password. If the user does not have a keyword or special billing number, then typically log on is complete and the user will indicate this by an affirmative response to the question. Otherwise, the user responds in the negative and enters his or her keyword. When log on is complete, the program then prompts the user to enter the log off command. Upon entering the log off command by the user, the teaching program logs off. Thereafter, when the user desires to log on the network, the log on procedure is performed automatically by the program by watching for the host prompt messages and sending the stored user responses corresponding to the received prompt messages from the host.

BRIEF DESCRIPTION OF THE DRAWINGS

The foregoing and other objects, aspects and advantages of the invention will be better understood from the following detailed description of a preferred embodiment with reference to the accompanying drawings, in which:

FIGS. 1 to 9, taken together, constitute a flow chart of the log on and log off instruction system according to the invention in which the connectors in each of the figures indicate the manner in which the several figures are interconnected to form the flow chart and wherein FIG. 1 is a portion of the flow chart which illustrates enter teach program and modem command logic, FIG. 2 is a further portion of the flow chart which illustrates communication connection logic, FIG. 3 is a further portion of the flow chart which illustrates user response and host data flow logic, FIG. 4 is a further portion of the flow chart which illustrates print and user response logic, FIG. 5 is a further portion of the flow chart which illustrates error check logic, FIG. 6 is a further portion of the flow chart which illustrates password check logic, FIG. 7 is a further portion of the flow chart which illustrates log on complete logic, FIG. 8 is a further portion of the flow chart which illustrates pass word switch and host prompt logic, and FIG. 9 is a further portion of the flow chart which illustrates host log off and user response logic.

DETAILED DESCRIPTION OF THE INVENTION

Figure 1:
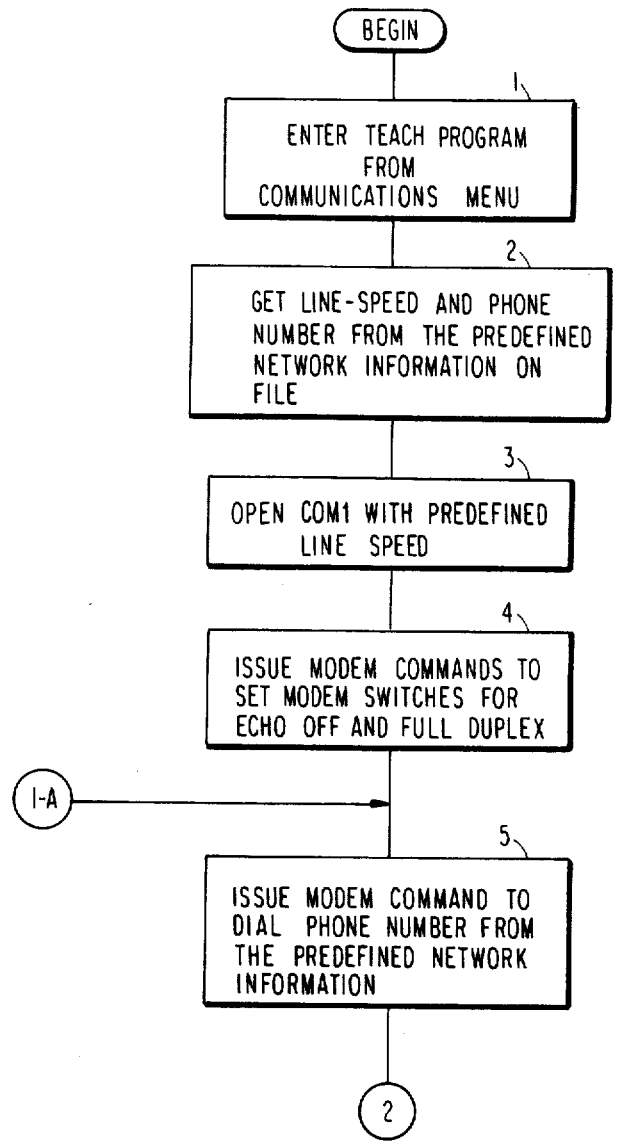

Referring now to the drawings, and more particularly to FIG. 1, the procedure according to the invention begins by entering the teach program from a displayed communications menu as indicated by block 1. The teach program gets the predefined network information from a file maintained by the personal computer as indicated in block 2 and then, in block 3, opens a communications port (here designated as COM1) using the line speed from the predefined information in the file. The teach program in block 4 issues the modem commands to set the mode switches, again based on the network information obtained from the file. Next, in block 5 the teach program issues a modem command to dial a predefined telephone number. The teach program now waits for the host-modem connection.

Figures 2, 3:
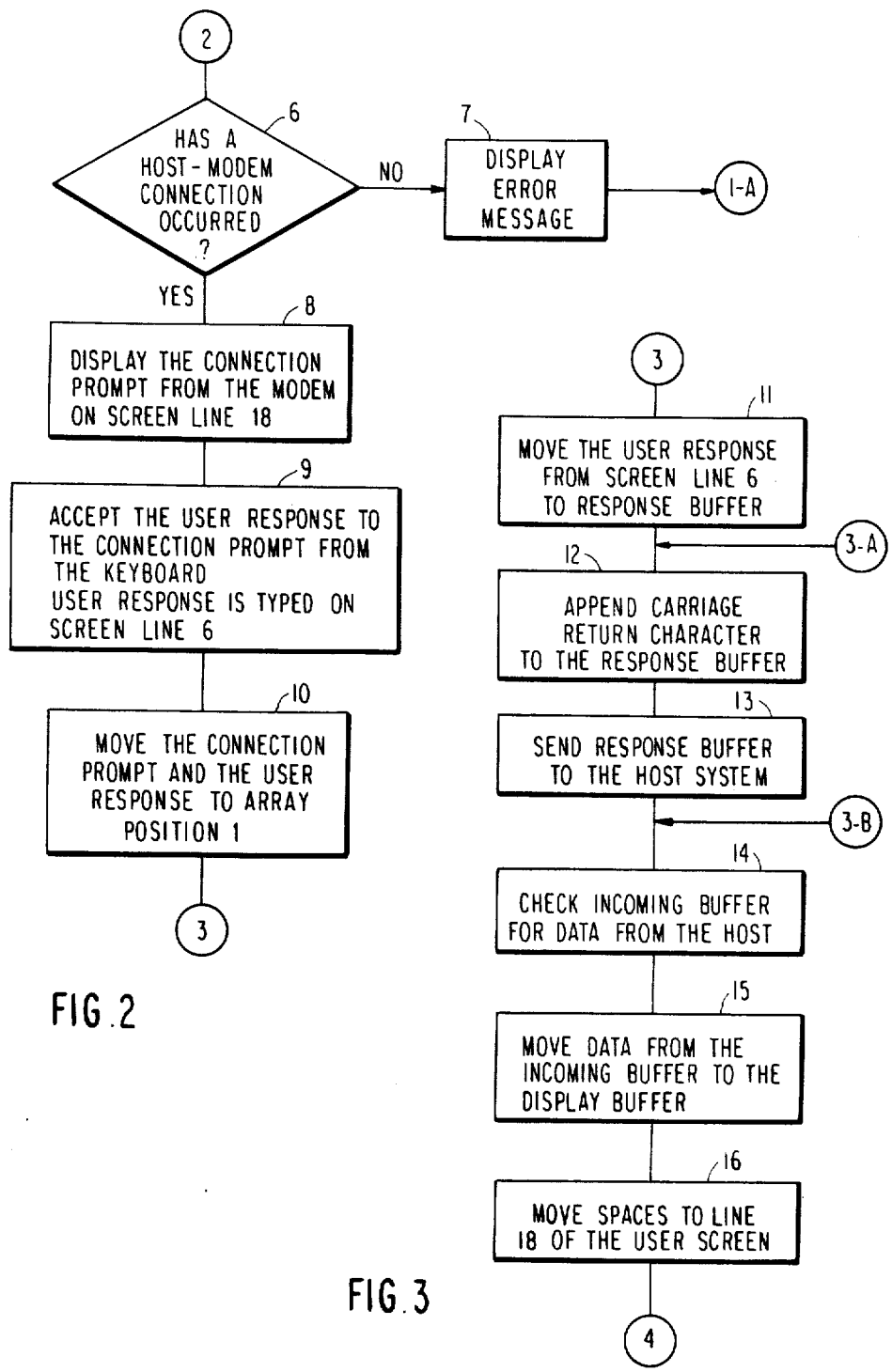

In FIG. 2, a test is made in decision block 6 for the host-modem connection. If the test fails, an error message is displayed in block 7 and the procedure loops back to block 5 on FIG. 1. On the other hand, if the host-modem connection is made, a connect prompt from the modem is displayed in block 8. In block 9, the user response from the keyboard is accepted, and the user response is displayed on line 6 of the screen shown in FIG. 10. Then in block 10, the connect prompt and user response are saved in the teach array position 1. The user response is then moved to the response buffer as shown in block 11 of FIG. 3. A carriage return character is appended to the user response in the response buffer as indicated in block 12, and after this is done, the user response is sent to the host system as indicated in block 13.

Figure 4:
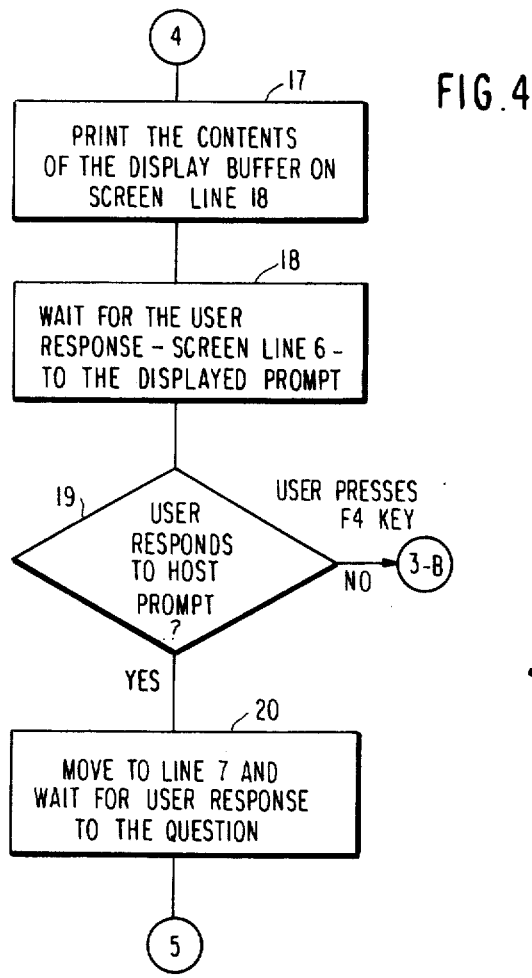

Next, in block 14, the program checks the incoming buffer for data from the host. When data is received in the incoming buffer, the program moves the data from the incoming buffer to the display buffer as indicated in block 15. As indicated in block 16 for the example being illustrated, the data from the incoming buffer is moved the required number of spaces so that it will occupy line 18 of the user display screen. Thus, when the contents of the display buffer are printed to the screen as indicated in block 17 of FIG. 4, the message from the host is displayed at line 18 of the user screen. This is shown in FIG. 10.

Figure 5:
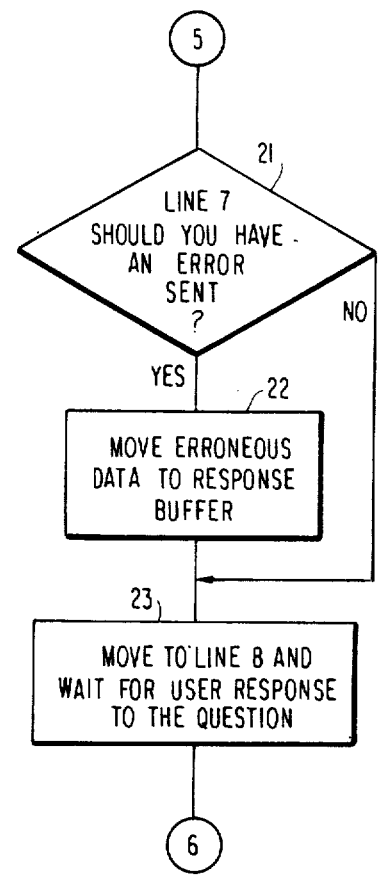

At this point, the program waits for a user response from the keyboard as indicated in block 18. Decision block 19 tests for a keyboard response by the user. That response could be a keyboard input for the program to ignore the message or it could be a response to a host prompt. In the example illustrated in FIG. 10, a host prompt is displayed on line 18, but assume for the moment that the host has sent a message which is merely informational in content and does not require a response from the user. The user presses the F4 key, for example, to tell the program to ignore the host message. In this case, the test in decision block 19 is negative and the program returns to block 14 in FIG. 3. However, returning to the illustrative example of FIG. 10, the prompt displayed on line 18 requires the user to enter his or her user ID code and it will now be assumed that the user does this. In this case, the test in decision block 19 is affirmative, and the program moves to line 7 of the display screen and waits for the user to respond to the question displayed on that line as indicated by block 20. As shown in FIG. 10, the question which the program asks the user is whether an error should be sent. The user responds by typing a Y for "yes" or an N for "no". The user input is tested in decision block 21 shown in FIG. 5, and if a Y is typed, the erroneous data is moved to the response buffer as indicated by block 22 and then the program proceeds to block 23; but if an N is typed, the program proceeds directly to block 23.

Figure 10:
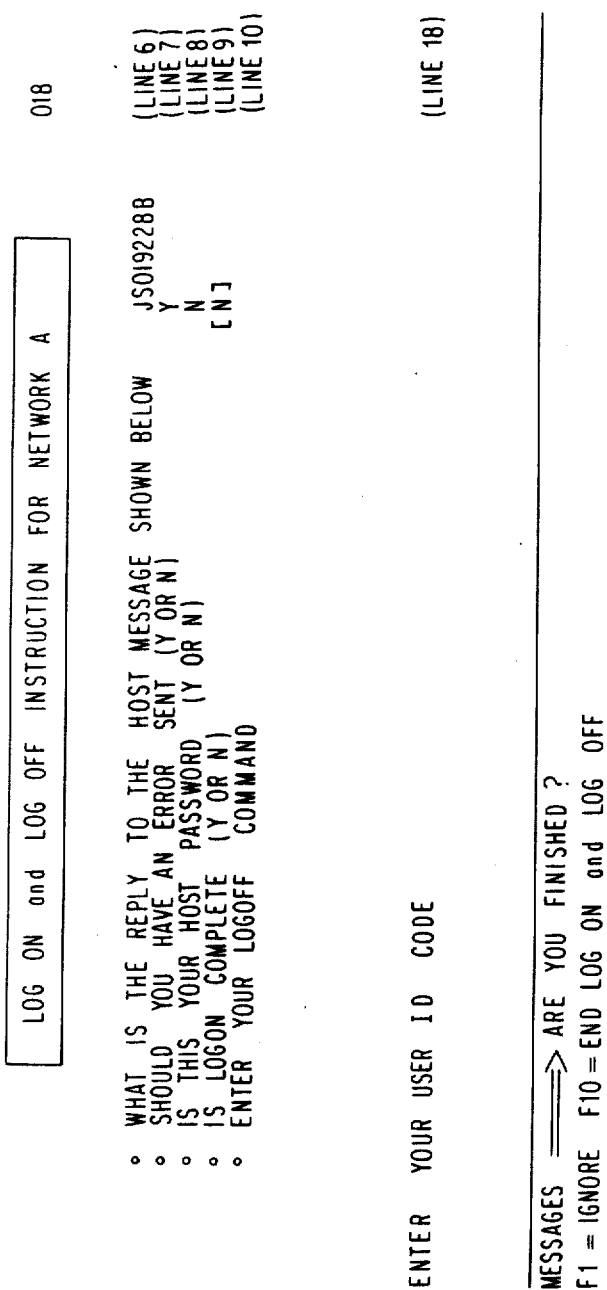
FIG. 10 illustrates a typical display screen which may be used in the practice of the invention.

The program now moves to line 8 of the display screen as shown in FIG. 10 and waits for the user's response to the question. In the illustrative example, the question posed is whether the user's password was just entered on line 6. Again, the user responds by typing a Y or an N, and decision block 24 in FIG. 6 tests for the user's response. If the response is affirmative, the host password prompt is moved to the teach array position 3 as indicated in block 25 and the password switch is set on as indicated in block 26. The process then continues to block 27. On the other hand, if the test in decision block 24 is negative, the process jumps directly to block 27.

Figures 8, 9:
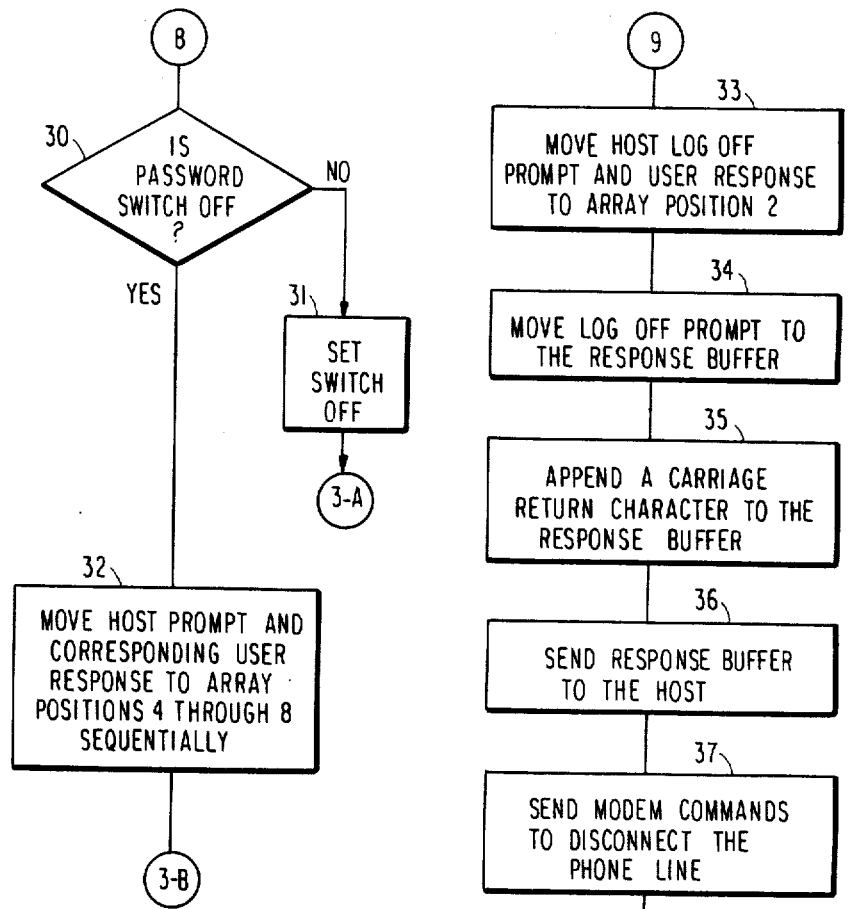

In block 27, the program moves to line 9 of the display screen shown in FIG. 10 and waits for the user response to the displayed question. As shown in the illustrative example of FIG. 10, the question asked by the program is whether log on is complete. Again, the user may respond with a Y or an N. Decision block 28 in FIG. 7 tests for the user's response. If log on is complete as indicated by the user typing a Y, then the program moves to line 10 of the display screen shown in FIG. 10 as indicated by block 29. This line prompts the user to enter his or her log off command, and when this is done, the program goes to block 33 in FIG. 9. On the other hand, if the test in decision block 28 is negative, the program goes to decision block 30 in FIG. 8.

Decision block 30 tests to determine if the password switch is off. It will be recalled that the password switch is set on in block 26 of FIG. 6. If the test is negative, the switch is set off in block 31 and the program returns to block 12 in FIG. 3. On the other hand, if the test is affirmative, the host prompt and corresponding user response are sequentially moved to the teach array positions 4 through 8 as indicated by block 32 and then the program returns to block 14 shown in FIG. 3.

Returning now to block 29 of FIG. 7, let it now be assumed that the user's log off command has been accepted. In this case, the program proceeds to block 33 shown in FIG. 9. As indicated by this block, the program moves the host log off and the user response to the teach array position 2. Then, in block 34, the log off prompt is moved to the response buffer. A carriage return character is appended to the log off prompt in the response buffer in block 35, and in block 36, the contents of the response buffer is sent to the host. To complete the log off process, the modem commands to disconnect the telephone lines are sent in block 37. The teach program finishes by writing the teach array to the communications file in block 38. The teach array is thereby stored for use in future automatic log ons. Finally, in block 39, the program exits to the communications menu.

The foregoing procedure completes a teaching session according to the invention. It will be appreciated that the procedure described basically involves the construction of a table of prompts and responses, i.e. the teach array, during the teaching session. Once this table has been constructed, it is used to automatically log on to the host system.

We claim:

1. In a data processing system wherein one or more host data processors may be accessed by a plurality of remote terminals via a communication network, a procedure for automatically logging on and off a selected host data processor comprising the steps of:

establishing a connection via said communication network between said host data processor and one terminal of said plurality of remote terminals;

displaying prompts for user responses from said host data processor at said one terminal;

constructing a table internal to said one terminal of prompts from said host data processor and corresponding responses from a user when a user logs on to said host data processor;

storing said table in said terminal for later access; and thereafter accessing said table of prompts and corresponding responses by said one terminal and matching received prompts from said host data processor with prompts in said table to automatically generate the required user responses to said host data processor prompts for logging on to said host data processor.

2. The procedure for automatically logging on and off a host data processor as recited in claim 1 wherein said communication network is one of a plurality of telephone networks, said step of establishing a connection comprising the steps of:

storing in said table a user selection of the telephone network to be used and the telephone number of said selected host data processor; and accessing said table to generate an access code for said telephone network and telephone number signals for said selected host data processor.

3. The procedure for automatically logging on and off a host data processor as recited in claim 1 further comprising the steps of:

storing in said table a log off code; and accessing said table to automatically generate said log off code when the user ends a session with the host data processor.

4. The procedure for automatically logging on and off a host data processor as recited in claim 1 further comprising the steps of:

prompting the user at said one terminal whether an erroneous response is to be sent to said host data process in response to a prompt;

transmitting an erroneous response to said host data processor if the user elects to send an erroneous response;

entering into said table a message and/or prompt received from said host data processor as a result of transmitting said erroneous response;

entering into said table a user response to the received message and/or prompt from the host data processor; and later when accessing said table to automatically generate the required user responses to said host data processor prompts for logging on to said host data processor, comparing received host data processor messages and/or prompts with messages and/or prompts entered into said table to locate the required user responses to said received messages and/or prompts.

5. The procedure for automatically logging on and off a host data processor as recited in claim 1 wherein the steps of the procedure are repeated once for every host data processor to which it is desired to log said one terminal on.

6. The procedure for automatically logging on and off a host data processor as recited in claim 1 wherein the steps are repeated for said selected host data processor only in the event that the log on procedure for that host data processor produces different host data processor prompts and messages from those previously stored in said table and/or requires different user responses.

* * * * *